United States Patent
Ascanelli et al.

(10) Patent No.: US 9,862,232 B2
(45) Date of Patent: Jan. 9, 2018

(54) PNEUMATIC TYRE FOR HEAVY LOAD VEHICLE WHEELS

(75) Inventors: Alessandro Ascanelli, Milan (IT); Alexandre Bregantim, Milan (IT); Giuseppe Cereda, Milan (IT); Guido Luigi Daghini, Milan (IT); Riccardo Pirovano, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 17 days.

(21) Appl. No.: 14/119,058

(22) PCT Filed: May 23, 2012

(86) PCT No.: PCT/IB2012/052574
§ 371 (c)(1),
(2), (4) Date: Nov. 20, 2013

(87) PCT Pub. No.: WO2012/164442
PCT Pub. Date: Dec. 6, 2012

(65) Prior Publication Data
US 2014/0083590 A1    Mar. 27, 2014

Related U.S. Application Data

(60) Provisional application No. 61/535,128, filed on Sep. 15, 2011.

(30) Foreign Application Priority Data

May 31, 2011  (IT) .............................. MI2011A0993

(51) Int. Cl.
*B60C 9/18* (2006.01)
*B60C 9/20* (2006.01)
(Continued)

(52) U.S. Cl.
CPC .......... *B60C 9/0007* (2013.01); *B60C 9/0057* (2013.01); *B60C 9/20* (2013.01);
(Continued)

(58) Field of Classification Search
CPC .......... B60C 9/18; B60C 9/1807; B60C 9/20; B60C 9/2006; B60C 9/22; B60C 9/2204
See application file for complete search history.

(56) References Cited

U.S. PATENT DOCUMENTS 2,792,868 A    5/1957  Benson
3,911,662 A   10/1975  Fenner
(Continued)

FOREIGN PATENT DOCUMENTS

EP    0 991 531    12/2001
EP    1 280 958     5/2005
(Continued)

OTHER PUBLICATIONS

International Search Report from the European Patent Office in PCT International Application No. PCT/IB2012/052574, dated Aug. 6, 2012.
(Continued)

*Primary Examiner* — Justin Fischer
(74) *Attorney, Agent, or Firm* — Finnegan, Henderson, Farabow, Garrett & Dunner, L.L.P.

(57) ABSTRACT

A pneumatic tyre for heavy load vehicle wheels, includes: a carcass structure, a belt structure applied in a radially outer position with respect to the carcass structure, and a tread band. The belt structure includes at least one reinforcing layer incorporating a plurality of reinforcing cords arranged substantially along the circumferential direction. The belt structure further comprises a first main belt layer and a second main belt layer wherein the first main belt layer includes a first plurality of metal cords inclined at a first (Continued)

angle and the second main belt layer includes a second plurality of metal cords inclined at a second angle. The metal cords of the first and second plurality of metal cords have a diameter not greater than 1.30 mm, and include a plurality of filaments having a diameter not greater than 0.30 mm.

17 Claims, 5 Drawing Sheets

(51) Int. Cl.
B60C 9/22 (2006.01)
B60C 9/00 (2006.01)

(52) U.S. Cl.
CPC .............. *B60C 9/2006* (2013.01); *B60C 9/22* (2013.01); *B60C 2009/2077* (2013.01); *B60C 2009/2083* (2013.01); *B60C 2200/06* (2013.01)

(56) References Cited

U.S. PATENT DOCUMENTS

| | | | |
|---|---|---|---|
| 4,169,495 A | 10/1979 | Maiocchi | |
| 4,293,019 A | 10/1981 | Maiocchi | |
| 4,454,903 A | 6/1984 | Noël et al. | |
| 4,819,705 A * | 4/1989 | Caretta | 152/527 |
| 5,321,941 A | 6/1994 | Bollen et al. | |
| 5,461,850 A | 10/1995 | Bruyneel et al. | |
| 5,647,928 A | 7/1997 | Umezawa et al. | |
| 5,661,965 A * | 9/1997 | Yanagisawa | 57/213 |
| 5,662,752 A | 9/1997 | Nakano | |
| 5,904,197 A | 5/1999 | Garlaschelli et al. | |
| 6,065,518 A | 5/2000 | Miyawaki et al. | |
| 6,442,922 B1 | 9/2002 | Han | |
| 6,460,587 B1 | 10/2002 | Herbelleau | |
| 6,557,605 B2 | 5/2003 | Yukawa et al. | |
| 6,659,147 B1 * | 12/2003 | Cordonnier | 152/526 |
| 6,817,395 B2 | 11/2004 | Sinopoli et al. | |
| 8,448,682 B2 | 5/2013 | Domingo et al. | |
| 2001/0027836 A1 * | 10/2001 | Miyazaki et al. | 152/450 |
| 2003/0106300 A1 | 6/2003 | Bruyneel et al. | |
| 2004/0020578 A1 | 2/2004 | Sinopoli et al. | |
| 2005/0016654 A1 | 1/2005 | Yukawa | |
| 2005/0269008 A1 | 12/2005 | Takagi | |
| 2006/0169383 A1 | 8/2006 | Radulescu et al. | |
| 2007/0169870 A1 | 7/2007 | Manno et al. | |
| 2010/0243122 A1 | 9/2010 | Domingo et al. | |
| 2010/0276050 A1 | 11/2010 | Minoli et al. | |
| 2011/0099967 A1 | 5/2011 | Daghini et al. | |

FOREIGN PATENT DOCUMENTS

| | | | |
|---|---|---|---|
| EP | 1 813 444 | | 8/2007 |
| GB | 1 466 114 | | 3/1977 |
| JP | 64-085384 | | 3/1989 |
| JP | 09-226318 | | 9/1997 |
| JP | 11-021774 | | 1/1999 |
| JP | 2001-020188 | | 1/2001 |
| JP | 2010-18942 | * | 1/2010 |
| WO | WO 2005/016666 | | 2/2005 |
| WO | WO 2008/141978 | | 11/2008 |
| WO | WO 2009/076970 | * | 6/2009 |
| WO | WO 2009/099155 A1 | | 8/2009 |
| WO | WO 2009/144746 A1 | | 12/2009 |
| WO | WO 2011/070542 | | 6/2011 |

OTHER PUBLICATIONS

U.S. Appl. No. 13/514,843, of G. L. Daghini et al., filed Jul. 11, 2012, entitled "Tyre for a Wheel of a Heavy Load Vehicle."
Third Party Observation for Application No. EP-2010/0816375, dated Dec. 23, 2013 (4 pages).

* cited by examiner

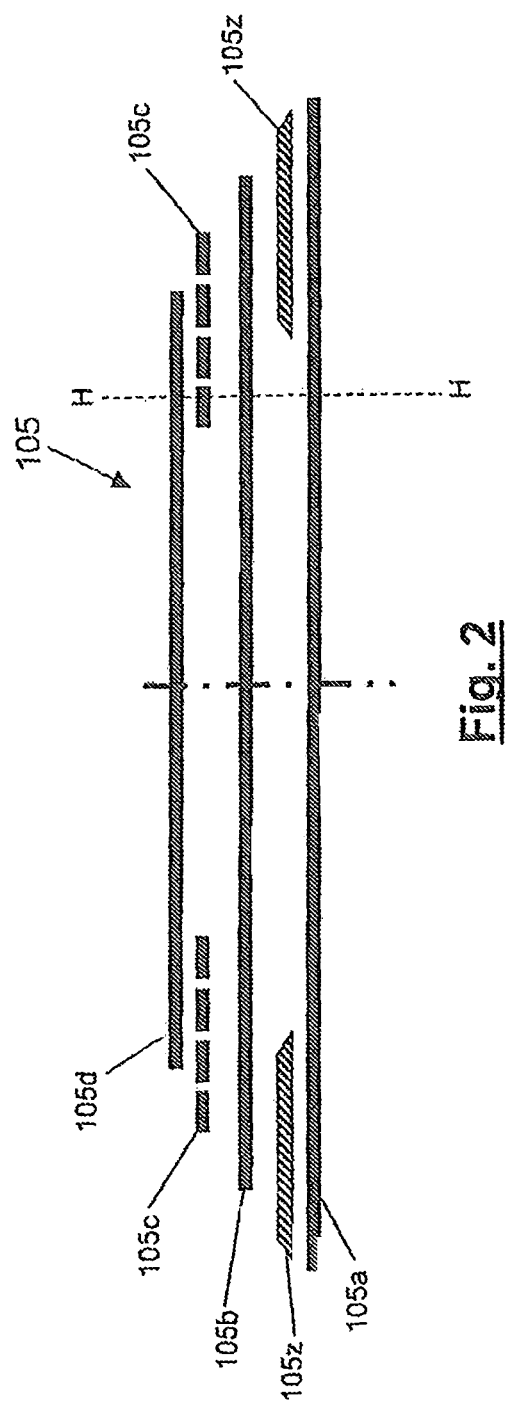

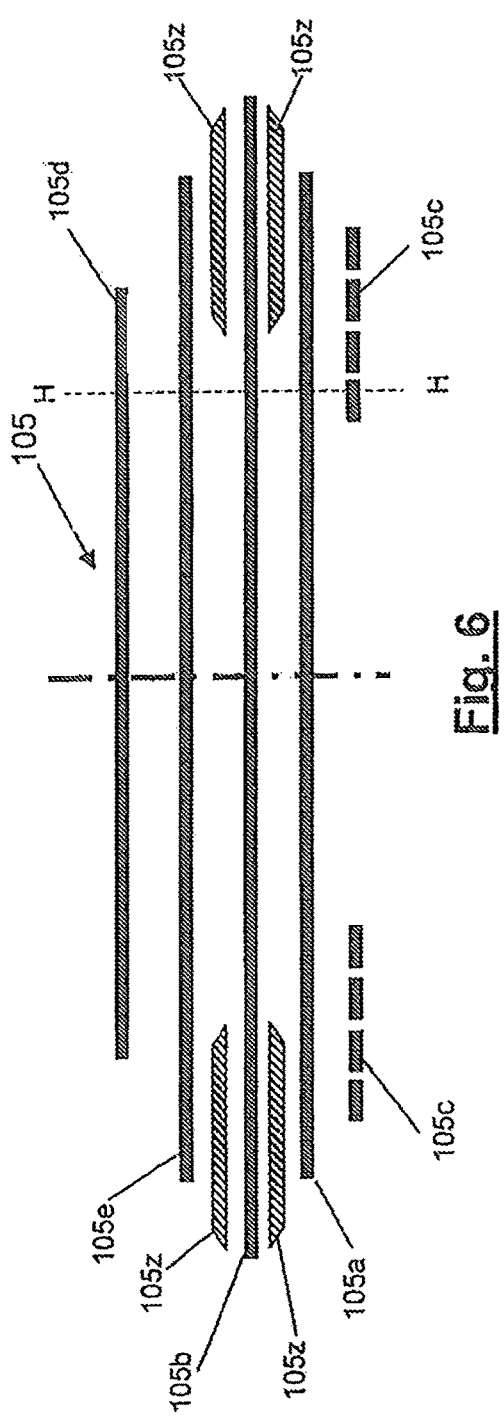
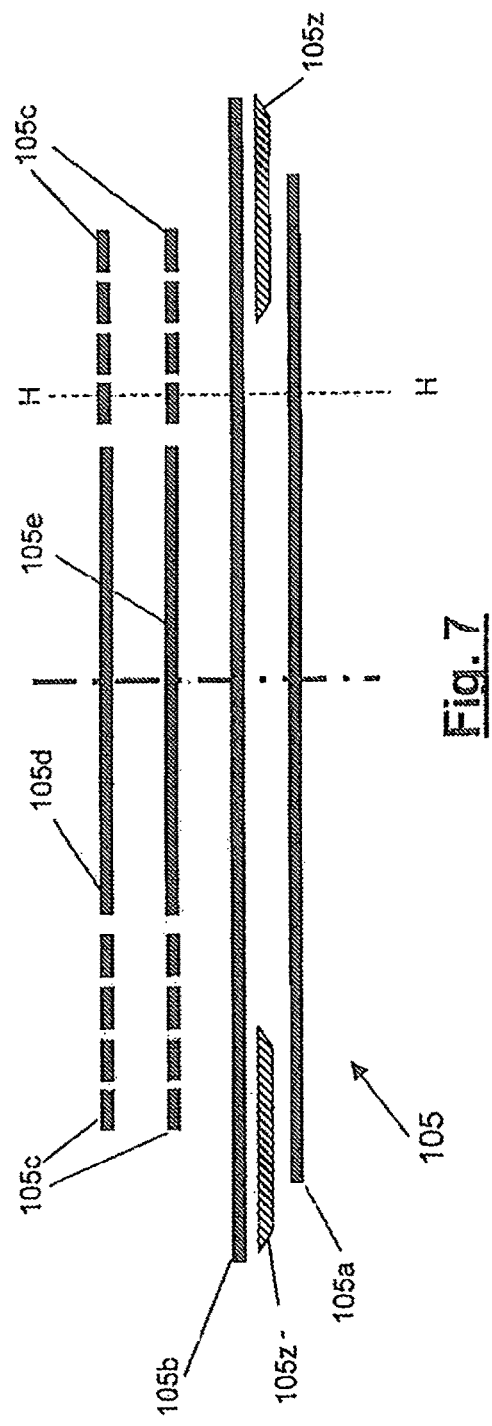

PNEUMATIC TYRE FOR HEAVY LOAD VEHICLE WHEELS

CROSS REFERENCE TO RELATED APPLICATIONS

This application is a national phase application based on PCT/IB2012/052574, filed May 23, 2012, and claims the priority of Italian Patent Application No. MI2011A000993, filed May 31, 2011, and the benefit of U.S. Provisional Application No. 61/535,128, filed Sep. 15, 2011, the content of each application being incorporated herein by reference.

FIELD OF THE INVENTION

The present invention relates to a pneumatic tyre for wheels of vehicles, in particular for wheels of heavy transportation vehicles, such as lorries, buses, trailers and in general for vehicles where the tyre is subject to a heavy load. The present invention may also be applied to light transportation vehicles.

PRIOR ART

The document U.S. Pat. No. 5,647,928 describes a tyre for transportation vehicles.

SUMMARY OF THE INVENTION

A pneumatic tyre for wheels of light or heavy transportation vehicles, such as lorries, buses, trailers or the like, is typically subject to particularly severe conditions of use and must possess particularly good integrity and/or stress-resistance properties. Even when used in an urban environment, and hence in an environment which is not particularly hostile, a transportation tyre must nevertheless withstand stresses of various types, as occur for example when mounting/dismounting pavements and/or encountering other similar obstacles.

A transportation tyre may also be used for vehicles which are intended for travel over long distances outside of cities and/or along motorways: in this case, the tyre must be able to provide an optimum performance in terms of driving comfort, both when mounted on a vehicle for transporting persons (buses) and when mounted on a vehicle for transporting goods (lorries, articulated lorries, etc.). A driver of a modern transportation vehicle in fact ideally requires a stable handling performance of the vehicle being driven, with minimum (or no) correction when passing over minor roughness along straight sections, but also a ready and/or gradual response when travelling around bends, so as to ensure, in all cases, the correct driving precision. The latest generation of heavy transportation vehicles require a superior handling performance because, in order to be able to satisfy market needs, they are designed to carry heavier loads, owing to the more powerful engines, improved suspension systems, varying weight distribution between traction unit and trailer, etc.

In order to develop correctly the tyres which are intended for transportation vehicles, and in particular heavy transportation vehicles, these requirements, which are increasingly sought after and recognized by the vehicle users and/or fleet managers, must therefore be taken into consideration.

In order to be able to offer the necessary integrity characteristics, the structure of these tyres is typically strengthened and rigidified so as to be able to withstand the numerous different stresses. For example, the internal structure of transportation tyres is composed of—carcass and/or belt— layers comprising metal cords with a high breaking load which are able to provide the tyre itself with a particular stress resistance. The Applicant has, however, noted that the use of a rigid structure may impart to the tyre negative characteristics in terms of the driving comfort, owing to a rapid transfer of the stresses produced by the travel on rough and/or uneven ground from the belt structure to the carcass structure and from the carcass structure to the vehicle passenger compartment.

The Applicant has considered the problem of providing a tyre intended for a transportation vehicle, and in particular heavy transportation vehicle, able to limit the stresses transferred to the carcass structure from the belt structure during travel, while satisfying the necessary requisites of integrity and resistance to strong impacts.

The Applicant has tested the use of metal reinforcing cords having a small diameter, and in particular comprising small-diameter metal filaments, in the layers of the belt structure and in particular in the main belt layers. These small-diameter filaments possess a high flexibility and lightness, these characteristics resulting in a reduction in the rigidity of the belt structure of the tyres.

Surprisingly, despite the fact that these small-diameter metal cords have a breaking load substantially less than the breaking load of the cords typically used in belt layers of heavy transportation tyres, and despite the fact that the belt structure is overall more flexible, the Applicant has found that there is an improvement in the integrity and/or stress-resistance characteristics of the tyres as well as in the rolling resistance.

These results have been corroborated by numerous stringent indoor and outdoor tests which the Applicant has carried out, some of these being described below by way of example. Without being limited to any one theory in this connection, the Applicant considers that this entirely unexpected synergic effect has been possible owing to an improvement in the overall working performance of the belt structure combined with the carcass structure. The assembly consisting of belt structure and carcass structure appears to absorb and dissipate more efficiently in all the reinforcing layers the stresses resulting from the impacts with roughness of the ground, ensuring at the same time a ready and precise response to the stresses caused by the movement of the steering wheel and/or arising from the driving axle of the vehicle.

Advantageously, through the use of the small-diameter cords it has also been possible to provide a semi-finished article with a smaller thickness and, in most cases, achieve a reduction in the overall weight of the tyre. Moreover, the corrosion resistance has also greatly benefitted as a result, owing to the very limited (practically zero) presence of interstices and air between the filaments of the cords incorporated in the belt layers.

According to a first aspect, the present invention relates to a pneumatic tyre for heavy load vehicle wheels, comprising: a carcass structure comprising at least one carcass ply; a belt structure applied in a radially outer position with respect to said carcass structure; and a tread band applied in a radially outer position with respect to said belt structure. The belt structure comprises at least one reinforcing layer incorporating a plurality of reinforcing cords arranged substantially along the circumferential direction. The belt structure comprises a first main belt layer and a second main belt layer which is radially outer with respect to said first main belt layer. The first main belt layer comprises a first plurality of metal cords inclined at a first angle with respect to the circumferential direction and the second main belt layer comprises a second plurality of metal cords inclined at a second angle with respect to the circumferential direction. The metal cords of said first and said second plurality of metal cords comprise a plurality of filaments having a diameter not greater than 0.30 mm. The metal cords of said first and said second plurality of metal cords have a diameter not greater than 1.30 mm.

Preferably, the cords of said first and said second plurality of metal cords have a diameter of between 0.90 mm and 1.20 mm.

Preferably, the cords of said first and of said second plurality of metal cords comprise a plurality of filaments having a diameter greater than, or equal to, 0.20 mm.

In embodiments of the invention, the cords of said first and said second plurality of metal cords comprise a first number of central filaments and a second number of crown filaments which are arranged around said central filaments.

Said central filaments and/or said crown filaments may be preformed.

Preferably, said at least one reinforcing layer incorporates a third plurality of metal cords comprising a plurality of stranded strands, wherein each strand comprises a plurality of metal filaments.

Preferably, the cords of said third plurality of metal cords have a diameter of between 0.80 mm and 1.30 mm.

Preferably, the cords of said third plurality of metal cords comprise filaments having a diameter smaller than or equal to 0.22 mm.

In embodiments of the invention, said belt structure also comprises a third belt layer applied as radially outermost layer of the belt structure, wherein said third belt layer comprises a fourth plurality of metal cords comprising a plurality of filaments.

Preferably, the metal cords of said fourth plurality of metal cords have a diameter of between 0.70 mm and 1.2 mm.

Preferably, the metal cords of said fourth plurality of metal cords comprise a plurality of filaments having a diameter greater than or equal to 0.22 mm.

Preferably, the metal cords of said third and/or said fourth plurality of metal cords are high elongation cords.

In embodiments of the invention, said tyre has a width greater than or equal to 365 mm. Said belt structure comprises a third main belt layer radially outer with respect to said second main belt layer, wherein said third main belt layer comprises a fifth plurality of metal cords inclined at a fourth angle with respect to the circumferential direction.

Preferably, the cords of said fifth plurality of metal cords have a diameter of between 0.90 mm and 1.20 mm.

Preferably, the cords of said fifth plurality of metal cords comprise a plurality of filaments having a diameter greater than or equal to 0.20 mm.

In embodiments of the invention, said at least one reinforcing layer is arranged in a radially outer position with respect to said second main belt layer.

In addition or as an alternative, said at least one reinforcing layer is arranged between said carcass structure and said belt structure.

In addition or as an alternative, said at least one reinforcing layer is arranged between two main belt layers.

Said at least one reinforcing layer may have a width of between about 10% and about 30% of the maximum width of the belt structure.

In some embodiments of the invention, most of the layers of said belt structure comprise metal cords comprising a plurality of filaments having a diameter not greater than 0.30 mm and having a diameter not greater than 1.30 mm.

In embodiments of the invention, all the layers of said belt structure comprise metal cords comprising a plurality of filaments having a diameter not greater than 0.30 mm and having a diameter not greater than 1.30 mm.

Preferably, a flexibility parameter of the belt structure is greater than or equal to 10%.

Here and in the continuation of the description, "diameter" of a cord is understood as meaning the diameter measured as laid down by the method BISFA E10 (The International Bureau for the Standardization of Man-Made Fibres, Internationally Agreed Methods for Testing Steel Tyre Cords, 1995 edition).

BRIEF DESCRIPTION OF THE DRAWINGS

Further characteristic features and advantages of the invention will emerge more clearly from the following description of a number of preferred embodiments thereof, provided by way of a non-limiting example, to be read with reference to the accompanying figures in which:

FIG. 2 is a schematic view of the belt structure of the tyre according to FIG. 1;

FIG. 6 is a schematic view of a belt structure which is particularly suitable for wide base tyres, according to another embodiment of the invention; and FIG. 7 is a schematic view of a comparison belt structure suitable for wide-base tyres.

DETAILED DESCRIPTION OF THE INVENTION

In the various figures the same reference numbers identify parts which are the same or functionally equivalent.

Figure 1:
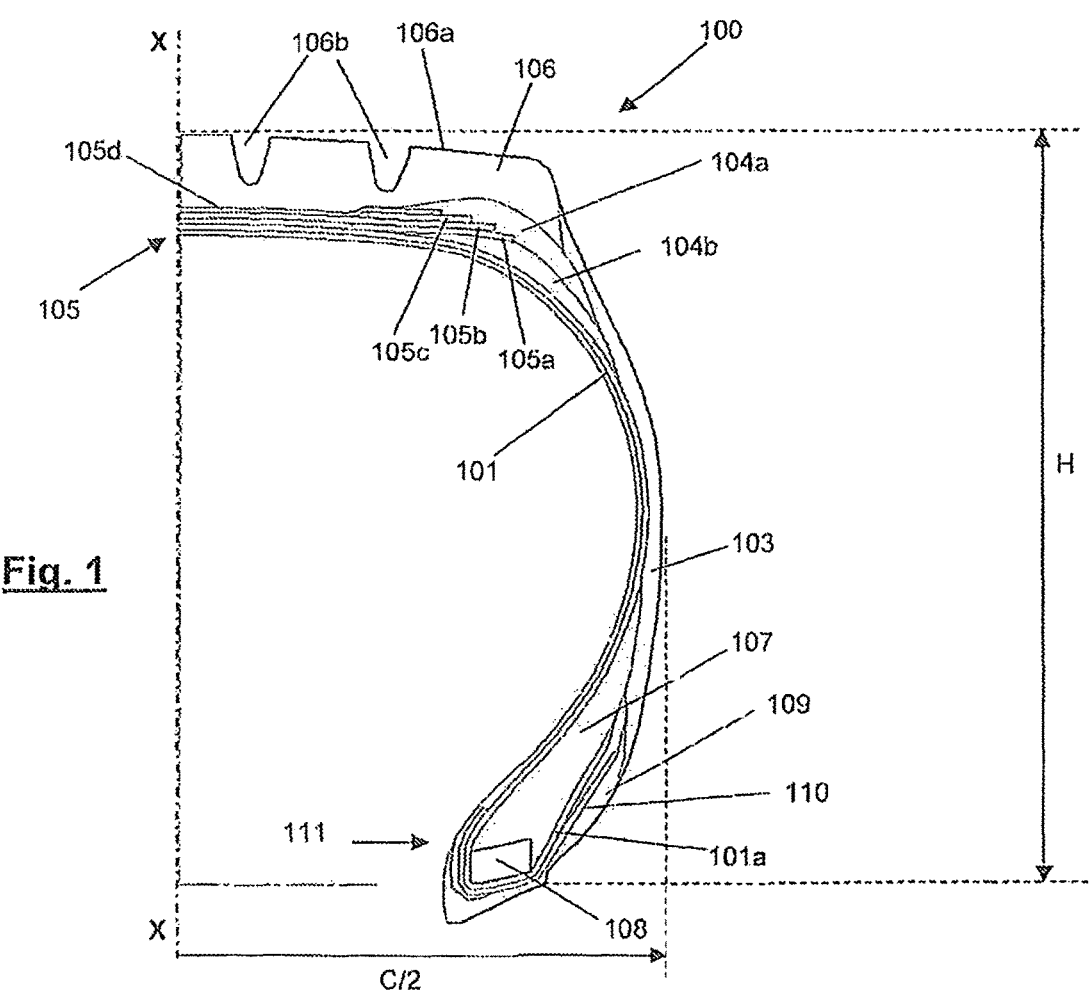
FIG. 1 is a schematic, partial, cross-sectional view of a tyre according to a first embodiment of the present invention.

FIG. 1 shows a partial cross-sectional view of a tyre according to a first embodiment of the present invention.

For the sake of simplicity, FIG. 1 shows only a part of the tyre 100, the remaining part which is not shown being substantially identical and being arranged symmetrically with respect to the equatorial plane X-X of the tyre. In the present description, the term "equatorial plane" is understood as meaning the plane perpendicular to the axis of rotation of the tyre and containing its centre line.

The tyre according to FIG. 1 is a tyre for wheels of heavy transportation vehicles, such as lorries, buses, trailers, vans and generally vehicles where the tyre is subject to a heavy load. Preferably, such a tyre is suitable for mounting on rims having a diameter greater than 17.5". A heavy transportation vehicle is for example a vehicle of the categories M2, M3, N2, N3, O2, O3 and O4 according to the "ECE Consolidated Resolution of the Construction of Vehicles (R.E. 3), Annex 7, Classification and Definition of Power-Driven Vehicles and Trailers", or the categories M3, N2, N3, O3, O4 according to the "ETRTO Engineering Design Information" (Edit. 2010), section "General Information", page G15 and G16, chapter "International Codes for Wheeled Vehicle Classification as UN/ECE 29/78 and Directive 2003/37". The category of heavy vehicles comprises lorries, tractor-trailers, vans, buses and similar vehicles.

The tyre 100 comprises at least one carcass ply 101, the opposite side edges of which are associated with respective bead structures 111 comprising a bead wire 108 and at least one bead filler 107. Joining together of said at least one carcass ply 101 and said bead structure 111 is typically obtained by folding over the opposite side edges of said at least one carcass ply 101 around said bead wire 108 and said at least one bead filler 107 so as to form a folded-over carcass portion 101a. An edge 110 and an anti-abrasive strip 109 may be conventionally arranged in the bead zone 111.

The at least one carcass ply 101 generally comprises a plurality of carcass ply reinforcing elements arranged substantially parallel to each other and at least partially lined with a layer of elastomer material. These carcass ply reinforcing elements, in particular in the case of lorry tyres, usually comprise metal cords, preferably steel cords.

The at least one carcass ply 101 is usually of the radial type, i.e. incorporates reinforcing elements arranged in a direction substantially perpendicular to the circumferential direction.

A belt structure 105 is applied in a radially outer position with respect to said at least one carcass ply 101. The belt structure 105 will be described in greater detail in the continuation of this description.

The belt structure comprises at least two radially superimposed main belt layers which incorporate a plurality of belt reinforcing elements, typically metal cords, preferably steel cords. The belt structure may also comprise a zero-degrees reinforcing layer applied, for example, in a radially outer position with respect to the second main belt layer.

The metal cords used in the layers of the belt structure 105, and in particular those used in the main belt layers, comprise a plurality of filaments having a diameter not greater than 0.30 mm. Preferably, these metal cords have a diameter not greater than 1.30 mm. Preferably, these cords with a small diameter and/or comprising small-diameter filaments are used in most of the layers of the belt structure 105. Even more preferably, they are used in all the layers of the belt structure 105.

The filaments of the metal cords used in the belt structure 105 (and typically also in other reinforcing layers of the tyre 100) are preferably NT (normal tensile), HT (high tensile), SHT (super high tensile) or UHT (ultra high tensile) steel filaments. Typically these steel filaments have a carbon content of less than about 1%. Preferably, the carbon content is greater than or equal to about 0.7%. The filaments are typically lined with brass or some other corrosion-resistant lining (for example Zn/Mn).

The belt structure 105 is relatively flexible. For the purposes of measuring the flexibility of the belt structure, a "flexibility parameter", fp, may be defined, given the ratio (|dc−ds|/dc), where:
  dc, i.e. centre radius difference, is the difference between the radius measured in the centre of the tread (not at a groove) of a tyre inflated to an inflation pressure of 7 bar and the radius, measured in the centre of the tread in the same position, of the same tyre inflated to an inflation pressure of 1 bar;
  ds, i.e. shoulder radius difference, is the difference between the radius measured in a shoulder zone of the tread (not at a groove) of a tyre inflated to an inflation pressure of 7 bar and the radius measured in the same shoulder zone and in the same position of the same tyre inflated to an inflation pressure of 1 bar. The measurement ds may correspond to a mean value of different measurements taken in different positions on the right-hand shoulder and left-hand shoulder (and/or also several values recorded in different positions in the same shoulder zone); and
  the symbol "| |" indicates the absolute value.

A flexibility parameter greater than or equal to 10% may be considered indicative of a flexible belt structure.

A tread band 106 is applied circumferentially in a radially outer position with respect to said belt structure 105. Externally, the tread band 106 has a rolling surface 106a suitable for coming into contact with the ground. Circumferential grooves 106b which may be connected by transverse sipes (not shown) define a tread pattern which comprises a plurality of ribs and/or blocks of varying shape and size, distributed over the rolling surface 106a.

A sidewall 103 is applied externally onto the carcass ply 101. The sidewall 103 extends in an axially outer position, from the bead structure 111 to the tread band 106.

In the embodiment shown in FIG. 1, an underlayer 104a is arranged in an area where the side edges of the tread band 106 are connected to the sidewall 103. The underlayer may also extend along the entire axial width of the crown portion of the tyre 100 and not only be limited to the side edge portion. An underbelt insert 104b may be arranged so as to support the axial ends of the belt structure 105.

An elastomer layer, generally known as a liner, which ensures the necessary impermeability for the tyre inflation air, may be provided in a radially inner position with respect to the carcass ply 101.

Preferably, the tyre 100 according to the present invention has an aspect ratio (H/C) of between 0.40 and 1.1 and more preferably between 0.45 and 1.0.

Said aspect ratio is the ratio between the height of the cross-section of the tyre H, i.e. the radial distance from the nominal diameter of the rim to the outer diameter of the tyre along its equatorial plane, and the width C (in FIG. 1, indicated as the measurement C/2, i.e. half of C) of the cross-section of the tyre, i.e. the maximum linear distance parallel to the axis of rotation of the tyre between the end outer surfaces of the sidewalls (in accordance with E.T.R.T.O., Edit. 2010, pages G3 and G4).

With reference to FIG. 2, the belt structure 105 comprises two main belt layers 105a and 105b which are radially superimposed and which incorporate a plurality of belt reinforcing elements (not shown in FIG. 2), typically metal cords, preferably steel cords. FIG. 2 shows a radially innermost layer 105a wider than a radially outermost layer 105b, but it may also be envisaged that the radially outermost layer 105b is wider than the radially innermost layer 105a.

The reinforcing elements of the belt layers are substantially parallel to each other in each belt layer and intersect the reinforcing elements of the adjacent belt layer and are inclined preferably symmetrically with respect to the circumferential direction of the tyre. Preferably, the angle of inclination (expressed as an absolute value) with respect to the circumferential direction of the tyres ranges between 10° and 70°, more preferably between 12° and 40°. The belt reinforcing elements are typically lined with an elastomer material.

Preferably, said belt reinforcing elements have a density of between 45 cords/dm and 80 cords/dm, preferably between 50 cords/dm and 75 cords/dm, measured on said two main belt layers 105a and 105b, in a circumferential direction, in the vicinity of the equatorial plane X-X of the tyre 100.

Figure 3A:
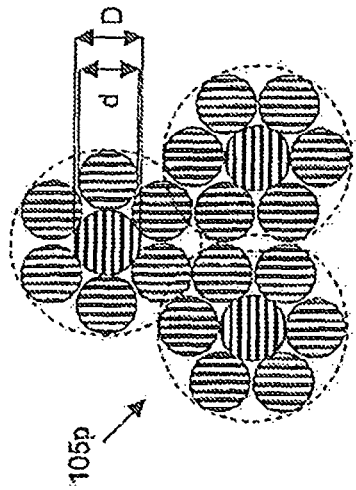
FIGS. 3a, 3b, 3c, 3d and 3e are schematic cross-sections (not to scale) through metal cords used in the belt layers of tyres according to the present invention.

FIG. 3a shows schematically a cross-section through a metal cord 105m suitable for being used in the main belts 105a, 105b. Preferably, the metal cords 105m of the main belts 105a and 105b have a diameter smaller than or equal to about 1.30 mm. Even more preferably, the metal cords 105m have a diameter of between about 0.90 mm and 1.20 mm.

Preferably, the metal cords 105m of the main belts 105a and 105b comprise thin filaments with a diameter smaller than or equal to about 0.30 mm, more preferably smaller than or equal to about 0.28 mm. Preferably, the filaments have a diameter greater than or equal to about 0.20 mm, even more preferably greater than or equal to about 0.22 mm.

Preferably, all the filaments have substantially the same diameter (with normal manufacturing tolerances). According to one embodiment, the cords 105m comprise a certain number (for example, from one to four) of central filaments (indicated by horizontal lines) and a certain number (for example five to nine) of crown filaments (indicated by vertical lines). The central filaments and the crown filaments are preferably stranded together in a single stranding step. The central filaments and/or the crown filaments may be preformed.

Figure 5:
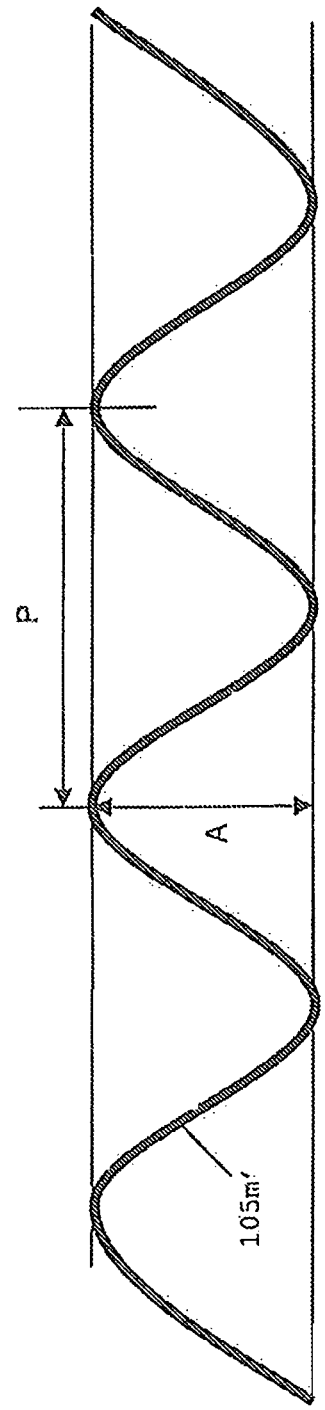
FIG. 5 shows schematically a section of preformed filament which can be used to form a reinforcing element for a belt structure according to the present invention.

FIG. 5 shows schematically a part of an example of a filament 105m' preformed sinusoidally and able to be used for forming the metal cords 105m of the main belts. The sinusoidal shape must not be regarded as being limiting. In fact, other waveforms (with a, for example, square, triangular, zigzag, sawtooth, helical or other shape) may be applied to the filaments intended for the cords of the main belt layers. Preforming may be performed using any known preforming apparatus. Typically, by means of preforming, substantially periodic predeformations, having a predetermined amplitude A and a predetermined pitch P, may be imparted to the filament. In a preferred configuration, the reinforcing elements of the main belts 105a, 105b comprise a first number of central filaments surrounded by a second number of crown filaments. Preferably:
- all the filaments, both the central filaments and the crown filaments, have substantially the same diameter;
- all the filaments, both the central filaments and the crown filaments, are stranded in the same stranding direction and substantially with the same stranding pitch;
- all the central filaments are not preformed;
- at least some of the crown filaments are preformed filaments;
- the first number is greater than or equal to two;
- the second number is greater than the first number;
- the second number is smaller than a third number equal to the number of filaments with the same diameter as central filaments which, if arranged around the first number of central filaments and in contact with the central filaments, would enclose entirely the first number of central filaments.

Reinforcing elements of this type are described, for example, in patent application WO 2009/144746, in the name of the same Applicant. Advantageously, the crown filaments surround the central filaments but do not enclose them completely, so as to leave small "channels" between the crown filaments such that the elastomer material may reach the central filaments and protect them completely.

The reinforcing elements 105m have optimum compressive load resistance characteristics.

Still with reference to FIG. 2, the belt structure 105 may comprise a third belt layer 105d applied as a radially outermost layer of the belt structure 105 and provided with reinforcing elements 105n, typically metal cords, preferably steel cords. The third belt layer 105d has advantageously a function of ensuring protection against the penetration, towards the innermost layers of the belt structure 105 (or even towards the carcass structure), of foreign bodies which may get trapped in the tread grooves, such as stones, grit, etc. The reinforcing elements 105n of the third belt layer 105d are arranged substantially parallel to each other and are inclined with respect to a circumferential direction of the tyre at an angle of between 10° and 70°, preferably between 12° and 40°. The reinforcing elements of the third belt layer 105d are typically lined with an elastomer material.

Preferably, said reinforcing elements of the third belt layer 105d have a density of between 40 cords/dm and 80 cords/dm, preferably between 40 cords/dm and 65 cords/dm, measured on said third belt layer 105d in a circumferential direction, in the vicinity of the equatorial plane X-X of the tyre 100.

Preferably, the reinforcing elements 105n of the third belt layer 105d comprise high elongation metal cords.

The term "high elongation (HE) metal cord" is understood as meaning a cord which:
a. has an elongation at break equal to at least 3.0%; and, preferably:
b. has a part load elongation of between 1% and 3%. "Part load elongation" is understood as meaning the difference between the percentage elongation obtained by subjecting the cord to a tensile force of 50 N and the percentage elongation obtained by subjecting the cord to a tensile force of 2.5 N.

The characteristic "a" mentioned above (high elongation at break loads) is calculated using the method BISFA E6 (The International Bureau for the Standardization of Man-Made Fibres, Internationally Agreed Methods for Testing Steel Tyre Cords, 1995 edition). The characteristic "b" mentioned above (high elongation % at low loads) is calculated using the method BISFA E7 (The International Bureau for the Standardization of Man-Made Fibres, Internationally Agreed Methods for Testing Steel Tyre Cords, 1995 edition).

Preferably, the metal cords 105n of the third belt layer 105d have a diameter smaller than or equal to about 1.2 mm. Preferably the metal cords 105n of the third belt layer 105d have a diameter greater than or equal to about 0.70 mm.

Preferably, the metal cords 105n comprise filaments with a diameter smaller than or equal to about 0.35 mm, more preferably smaller than or equal to about 0.30 mm, even more preferably smaller than or equal to about 0.28 mm. Preferably, the metal cords 105n comprise filaments with a diameter greater than or equal to about 0.22 mm.

Figure 3B:
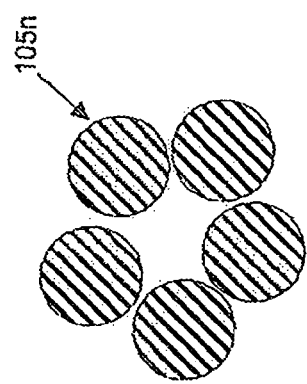

Preferably, all the filaments have substantially the same diameter (within normal manufacturing tolerances). According to one embodiment, the cords 105n comprise a certain number (for example, three to seven) filaments which are stranded together, as shown for example in FIG. 3b. The filaments may be advantageously preformed, as described above.

Advantageously, still with reference to FIG. 2, the belt structure 105 of the tyre 100 also comprises a zero-degrees reinforcing layer 105c (or lateral reinforcing layer) applied in a radially outermost position with respect to the second main belt layer 105b. This layer 105c may be substantially as wide as the main belt layers. However, preferably, this layer 105c is made with strips having a small width, less than the width of the main belt layers, and arranged substantially in the vicinity of the axial ends of the belt structure 105.

In the embodiment shown in FIGS. 1 and 2, the layer 105c is arranged in the vicinity of the axial end of the tyre and is applied in a radially outer position with respect to the second main belt layer 105b. Said lateral reinforcing layer 105c typically incorporates a plurality of reinforcing elements 105p, typically metal cords, preferably steel cords. Unlike the other layers of the belt structure, the reinforcing elements 105p of the lateral reinforcing layer 105c are oriented in a substantially circumferential direction, thus forming a substantially zero angle (for example an angle of between about 0° and about 10°) with respect to the equatorial plane X-X of the tyre. Typically, they are lined with an elastomer material.

The zero-degrees reinforcing layer 105c comprises a number of reinforcing elements, typically metal cords. The number of reinforcing elements of the zero-degrees reinforcing layer 105c varies depending on the width of the layer itself. Said reinforcing elements are arranged substantially parallel to one another.

According to embodiments, the reinforcing elements are arranged in the zero-degrees reinforcing layer 105c with a density of between 45 and 70 cords/dm.

Preferably, the strip or strips of limited width of the zero-degrees reinforcing layer 105c has/have a width of between about 10% and about 30% of the maximum width of the belt structure 105 (namely the width of the broadest belt layer in the lateral direction). In some embodiments the width of the strip or strips of the zero-degrees reinforcing layer 105c may range between about 12.0 mm and about 60.0 mm.

Figure 4A:
FIGS. 4a and 4b are schematic cross-sections through a strip of elastomer material with reinforcing elements for forming a thin lateral reinforcing band of the belt structure of the tyre according to FIG. 1 or FIG. 2.
Figure 4B:
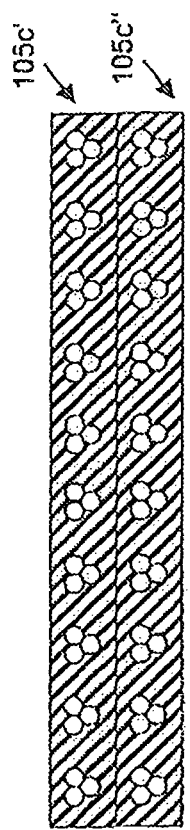

According to a preferred embodiment, the zero-degrees reinforcing layer 105c may be made by winding two or three radially superimposed turns of a rubberized strip of predetermined width. The rubberized strip according to this variant has a width substantially equal to the width of the layer 105c itself. FIGS. 4a and 4b show schematically, in a cross-sectional view, a first turn of rubberized strip 105c' and a second turn of rubberized strip 105c" which is radially superimposed on the first turn. The rubberized strip 105c', 105c" comprises a certain number of reinforcing elements 105p (shown only schematically). The rubberized strip 105c', 105c" has a longitudinal axis and the reinforcing elements of the rubberized strip are arranged substantially parallel to this longitudinal axis. According to embodiments, the thickness of the rubberized strip 105c', 105c" ranges between about 1.0 mm and about 2.0 mm.

According to a second embodiment, the zero-degrees reinforcing layer 105c may be made by axially spiral-winding next to each other a rubberized cord or a thin rubberized band comprising reinforcing cords having a width smaller than the overall width of the zero-degrees reinforcing layer 105c.

Figure 3C:
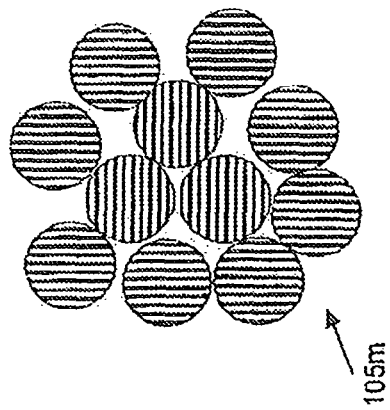
Figure 3E:
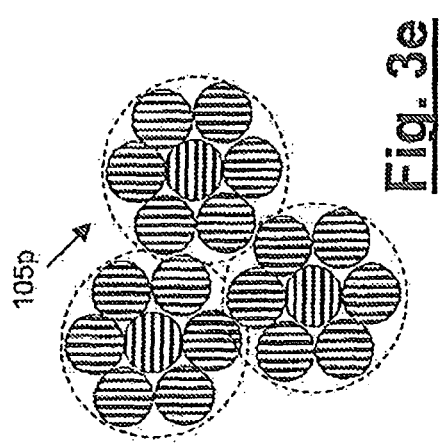
Figure 3D:
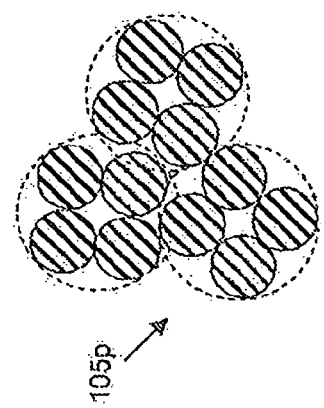

Preferably, the reinforcing elements of the zero-degrees reinforcing layer 105c comprise high-elongation metal cords. Some examples of these cords 105p are shown schematically in FIGS. 3c, 3d and 3e.

Preferably, the metal cords 105p have a diameter smaller than or equal to about 1.30 mm. Preferably, the metal cords 105p have a diameter greater than or equal to about 0.80 mm, more preferably greater than or equal to about 1.0 mm.

Preferably, the metal cords 105p of the zero-degrees reinforcing layer 105c comprise thin filaments, with a diameter smaller than or equal to 0.22 mm, more preferably smaller than or equal to about 0.175 mm. Preferably the metal cords 105p of the zero-degrees reinforcing layer 105c comprise filaments with a diameter greater than or equal to 0.12 mm, more preferably greater than or equal to about 0.14 mm.

Preferably, each cord comprises a plurality (for example, two to four) strands (shown with a broken-line circumference) stranded together, for example helically wound. Each strand, in turn, may comprise one or more central filaments (indicated by horizontal lines in FIG. 3c) and a plurality (for example four to seven) of crown filaments (indicated by vertical lines in FIG. 3c) arranged so as to form a single circular crown ring around the central filament. Preferably, the central filament has a diameter D greater than the diameter d of the crown filaments.

According to a preferred embodiment, the third belt layer 105d may be arranged so as cover at least partially the zero-degrees reinforcing layer 105c in the radial direction. This provides an advantageous and important protection for at least one part of the zero-degrees reinforcing layer 105c.

Preferably, the third belt layer 105d covers the zero-degrees reinforcing layer 105c over at least half of its width. In one embodiment the third belt layer 105d covers substantially all the zero-degrees reinforcing layer 105c (for example at least 80% of the zero-degrees reinforcing layer). This offers at least two significant advantages. Firstly the zero-degrees reinforcing layer 105c is much less subject to damage caused by stones, grit or other foreign bodies which might penetrate from the tread radially towards the inside of the tyre and which could cause penetration of an oxidising agent (for example water or moisture) towards the reinforcing elements of the zero-degrees reinforcing layer 105c. This preserves the integrity of the zero-degrees reinforcing layer 105c and greatly reduces the probability that the tyre will be rejected during reconstruction owing to corrosion of the reinforcing elements. Secondly, reconstruction of the tyre is made easier and safer. In fact, it is possible to remove the tread without the risk of tearing or unravelling the zero-degrees reinforcing layer 105c.

In addition or as an alternative to the zero-degrees reinforcing layer 105c applied in a radially outer position with respect to the second main belt layer 105b, it is possible to envisage providing also a zero-degrees layer (for example a strip arranged in an axially outer position of the belt structure or a layer substantially as wide as the main belt layers) between the main belts 105a, 105b and/or a zero-degrees reinforcing layer (for example a strip arranged in an axially outer position of the belt structure or a layer substantially as wide as the layers of the main belt layers) between the carcass structure 101 of the tyre and the radially innermost main belt 105a. An example of a belt structure of this type will be described further below.

In this case also, the above-described zero-degrees reinforcing layers arranged between the main belts and/or between the carcass and radially innermost main belt may be formed by means of axially spiral-winding next to each other a rubberized cord or a rubberized strip comprising reinforcing cords. Also as regards the reinforcing elements of these reinforcing layers, reference may be made to that described above in connection with the high elongation cords preferably included in the zero-degrees reinforcing layer 105c.

With reference to FIG. 2, this shows, in addition to the layers 105a, 105b, 105c and 105d, rubber spacers 105z arranged in between at the ends of the layers in order to prevent initial fissuring due to a concentration of stresses.

Below some results obtained by the Applicant during indoor and outdoor tests carried out on tyres constructed in accordance with the present invention are shown in relation to a comparison tyre. Belt structures reinforced by the cords shown in Table 1 were used in these tests. Measurement of the break load of the cords was carried out in accordance with the abovementioned method BISFA E6. The measurement of the rigidity of the cords was carried out by constructing, with each cord, a ring of predefined diameter (by welding the ends) and measuring the force required to cause predetermined crushing of the ring itself.

TABLE 1

| Structure | | Filament diameter [mm] | Cord diameter [mm] | Cord break load [N] | Cord rigidity [N] |
|---|---|---|---|---|---|
| 3 + 8 × 0.33 | Three non-preformed central filaments and eight preformed crown filaments | 0.33 | 1.38 | 2650 | 1.63 |
| 3 + 6 × 0.28 | Three non-preformed central filaments and six non-preformed crown filaments | 0.28 | 1.06 | 1550 | 0.59 |
| 3 + 8 × 0.28 | Three non-preformed central filaments and eight preformed crown filaments | 0.28 | 1.16 | 1730 | 0.78 |
| 3 × 7 × 0.22 | Three stranded strands. Each strand has a non-preformed central filament and seven non-preformed crown filaments with the same diameter | 0.22 | 1.52 | 1750 | 0.44 |
| 3 × (1 × 0.20 + 6 × 0.175) | Three stranded strands. Each strand has a non-preformed central filament and six non-preformed crown filaments with a different diameter | 0.20 (central) 0.175 (crown) | 1.25 | 1280 | 0.21 |
| 5 × 0.25 | Five preformed filaments | 0.25 | 0.75 | 680 | 0.22 |
| 5 × 0.35 | Five preformed filaments | 0.35 | 1.19 | 1000 | 0.85 |

As can be noted from Table 1, the cords 3+6×0.28 and 3+8×0.28 have a break load and rigidity which are less than those of the corresponding cords 3+8×0.33 with larger-diameter filaments. Similarly, the cords 3×(1×0.20+6×0.175) have a break load and rigidity less than those of the cords 3×7×0.22 with larger-diameter filaments. Similarly, the cords 5×0.25 have a breaking load and rigidity less than those of the cords 5×0.35 with larger-diameter filaments.

The Applicant constructed two tyres B and C in accordance with the present invention and compared them with a comparison tyre A. All the tyres A, B and C were of the same size (315/80 R22.5) and comprised a belt structure as shown in FIGS. 1 and 2. The main characteristics of the belt layers of the tyres A, B and C are summarised in the Tables 1.1 and 1.2. The angle of the cords is not repeated in Table 1.2 since it is unvaried.

TABLE 1.1

| | Tyre A (comparison tyre) | | |
|---|---|---|---|
| Layer | Cord angle | Cord | Density [cord/dm] |
| 105a | +21° | 3 + 8 × 0.33 | 45 |
| 105b | −17° | 3 + 8 × 0.33 | 45 |
| 105c | 0° | 3 × 7 × 0.22 | 50 |
| 105d | +17° | 5 × 0.35 | 40 |

TABLE 1.2

| | Tyre B (acc. to invention) | | Tyre C (acc. to invention) | |
|---|---|---|---|---|
| Layer | Cord | Density [cord/dm] | Cord | Density [cord/dm] |
| 105a | 3 + 6 × 0.28 | 70 | 3 + 8 × 0.28 | 70 |
| 105b | 3 + 6 × 0.28 | 70 | 3 + 8 × 0.28 | 70 |
| 105c | 3 × (1 × 0.20 + 6 × 0.175) | 60 | 3 × (1 × 0.20 + 6 × 0.175) | 60 |
| 105d | 5 × 0.35 | 40 | 5 × 0.25 | 50 |

In general, the belt structure of the tyres B and C comprised cords with a smaller diameter than those of the cords of tyre A, formed with thinner filaments. In general, the density increased when changing from A to B and C. The smaller diameter of the cords (and the single filaments) of the tyres B and C, although having a greater density, allowed the formation of belt structures which are more flexible, thinner and lighter than the belt structures used in the reference tyre A.

The weight of the belt structure and the thickness of the belt structure measured along the section H of FIG. 2 are indicated in Table 2.

TABLE 2

| | Tyre A | Tyre B | Tyre C |
|---|---|---|---|
| Weight [kg] | 12 | 10.4 | 10.3 |
| Thickness [mm] | 7.0 | 6.1 | 6.0 |

As can be seen from Table 2, the weight of the belt structure of the tyre B or C (according to the invention) is about 13-14% less than the weight of the belt structure of the comparison tyre A. The thickness of the belt structure of the tyre B or C is about 14% less than the thickness of the belt structure of the comparison tyre A.

Rigidity Test of the Belt Structure

The Applicant carried out an indoor test in order to assess the flexibility parameter fp of the belt structure of the tyres A and B. Each of the tyres was inflated to a pressure of 1 bar. At this pressure, by means of a TriScan-Tire laser profilometer, manufactured by Dr. Noll GmbH, the radius along the equatorial plane and along the (right-hand and left-hand) shoulders, at the same distance from the equatorial plane, was measured. Then, the tyres were inflated to a pressure of 7 bar and the same radius measurements were carried out along the equatorial plane and on the shoulders. For each shoulder, two radius measurements were taken on the right-hand shoulder and two radius measurements taken on the left-hand shoulder, and the mean of the measurements taken was considered.

For each measurement, the difference between the radii obtained at 1 bar inflation pressure and at 7 bar inflation pressure, together with the flexibility parameter fp, was then calculated. The results obtained are summarised in Table 3.

TABLE 3

|  | Tyre A (comparison tyre) | Tyre B (acc. to invention) | Tyre C (acc. to invention) |
| --- | --- | --- | --- |
| Centre radius difference (dc) | 2.050 mm | 2.080 mm | 1.580 mm |
| Mean value of shoulder radius difference (ds) | 1.995 mm | 1.663 mm | 1.845 mm |
| Difference (dc − ds) | 0.055 mm | 0.418 mm | −0.265 mm |
| Flexibility parameter fp (\|dc − ds\|/dc) | 2.7% | 20.1% | 16.8% |

Tyre A: when the pressure was changed from 1 to 7 bar, the radius of the tyre increased by 2.050 mm. On average, the radius in the shoulder zone increased by 1.995 mm. Therefore, the increase in diameter was substantially the same in the centre and at the shoulders and the tyre was deformed in a substantially uniform manner.

Tyres B and C: when the pressure was changed from 1 to 7 bar, the radius of the tyre increased by 2.080 mm and 1.580 mm, respectively. On average, the radius at the shoulders increased, by 1.663 mm and 1.845 mm, respectively. Therefore, the increase in diameter was different between centre and shoulders.

The belt structure of the tyres B and C according to the invention was therefore much more flexible than that of the comparison tyre.

Despite the increase in flexibility of the belt structure, the Applicant did not note any substantial differences in the form of the footprint area between tyres of type A and tyres of type B/C, nor in the pressure distribution in the footprint area. The footprint recording test was carried out using a commercial sensor manufactured by Tekscan.

Rolling Resistance

The Applicant measured the rolling resistance of the tyres A and B using a test in accordance with the ISO Standard 18164:2005. Considering the rolling resistance of tyre A to be equal to 100, the rolling resistance measured for tyre B was 95, with an advantageous 5% reduction. This reduction was unexpected, in view of the increased flexibility of the belt structure which, it was thought, might increase the rolling resistance, owing to the possible greater deformations affecting the tyre in the footprint zone.

Integrity Test

This outdoor test was carried out on a track mounting the tyres of type A and C on a trailer subject to an overload and with the tractor vehicle being driven around a circuit consisting of alternating laps of a larger diameter circular loop (adjusted so to correspond substantially to a straight path) and laps around a tighter figure-of-eight circuit. This test therefore simulates use of the tyres under very severe conditions. In the case of the tyres A, the test was interrupted following breakage, due to fatigue, of the tyres at about 22,000 km. The tyres A therefore confirmed that they have excellent resistance characteristics. In the case of the tyres C, the test was continued for about 25,000 km without encountering any breakage, therefore providing even better results.

During the abovementioned integrity test, the Applicant measured, using a system comprising a thermocouple, the average temperature inside the tyres, between tyre and trim, and detected that during rolling the temperature reached by the tyres C was about 2° to 3° less (for the same external atmospheric conditions) than the temperature reached by the tyres A.

Basically, the tyres according to the present invention surprisingly proved to have better integrity and rolling resistance characteristics and generated less heat than the reference tyres. All this was achieved despite and in addition to a not negligible reduction in weight of the belt structure (and therefore the entire tyre) and despite the use of metal reinforcing cords with a rigidity and breaking load less than those of metal cords typically used in conventional belt structures.

FIG. 6 is a schematic view of the belt structure of a tyre according to a second embodiment of the present invention suitable for wide-base tyres (for example with a width greater than or equal to 365). These tyres may be for example used on trailers of lorry-and-trailer units in place of pairs of narrower tyres or also on the front axle of the drive unit. In the case of these tyres also, it is of fundamental importance that they should have optimum integrity and stress-resistance characteristics.

With these tyres, too, the Applicant tested the use of more flexible metal reinforcement cords with a small diameter and in particular comprising small-diameter metal filaments, in particular in the main belt layers. Surprisingly, despite the fact that these small-diameter metal cords have a breaking load substantially less than the breaking load of the cords typically used in belt layers of heavy transportation tyres, and despite the fact that the belt structure is overall more flexible, the Applicant registered an improvement also in the integrity and/or stress resistance characteristics of the tyres.

In a similar manner to the first embodiment, the belt structure 105 comprises a first main belt layer 105a and a second main belt layer 105b situated radially outer with respect to the first main layer structure 105a. The characteristics of the layers 105a and 105b and the metal reinforcing cords included in them are as in the first embodiment and therefore a detailed description thereof will not be repeated. Preferably, the second main belt layer 105b extends axially beyond the end of the first main belt layer 105a.

The belt structure 105 may also comprise a third belt layer 105d which is applied as a radially outermost layer of the belt structure 105. The characteristics of the layer 105d and the metal reinforcing cords included in them are as in the first embodiment and a detailed description thereof will therefore not be repeated.

A further main belt layer 105e may be provided in a radially outer position with respect to the second main belt layer 105b. The further main belt layer 105e has, preferably, characteristics which are similar to those of the main belt layers 105a and 105b.

Advantageously, the belt structure 105 of the tyre of the second embodiment also comprises a zero-degrees reinforcing layer 105c applied in a radially inner position with respect to the first main belt layer 105*a*. This layer 105*c* may be substantially as wide as the main belt layers. However, preferably this layer 105*c* is made with strips of limited width arranged substantially in the vicinity of the axial ends of the belt 105. Apart from the different location, the zero-degrees reinforcing layer 105*c* of this embodiment has characteristics similar to those of the zero-degrees reinforcing layer 105*c* described with reference to FIGS. 1 and 2. Rubber spacers 105*z* may be advantageously provided, being arranged in between at the ends of the layers in order to prevent initial fissuring due to a concentration of stresses.

The Applicant constructed two tyres B1 and C1 in accordance with the second embodiment described above and compared them with a comparison tyre A1 having a different belt structure, at present used by the Applicant in some products. All the tyres A1, B1 and C had the same wide-base size (385/65 R22.5). The belt structure of the tyres B1 and C1 is that shown in FIG. 6, while the belt structure of the tyre A1 (comparison tyre) is shown in FIG. 7.

The belt structure of the tyre A1 (comparison tyre) is different from that of the tyres B1 and C1. FIG. 7 shows a first main belt 105*a*, a second main belt 105*b*, situated radially on the outside of the first main belt 105*a* and extending beyond the first main belt 105*a* in an axial direction, a third main belt 105*e* situated radially on the outside of the second main belt 105*b* and terminating before the second main belt 105*b* in an axial direction and a further belt layer 105*d* situated radially on the outside of the third main belt 105*e*. In the belt structure of the tyre A1 there is a double zero-degrees layer 105*c*.

Below some results obtained by the Applicant during indoor and outdoor tests of wide-base tyres constructed in accordance with the present invention are shown in relation to a comparison wide-base tyre. Belt structures reinforced by the cords shown in Table 4 were used in these tests.

The main characteristics of the belt layers of the tyres A1 and B1 and C1 are summarised in the Tables 4.1 and 4.2

TABLE 4.1

| | | Tyre A1 (comparison tyre) | |
|---|---|---|---|
| Layer | Cord angle | Cord | Density [cord/dm] |
| 105a | +21° | 3 + 6 × 0.35 | 48 |
| 105b | −17° | 3 + 6 × 0.35 | 48 |
| 105c | 0° | 3 × 7 × 0.20 | 45 |
| 105c | +17° | 3 × 4 × 0.22 | 40 |
| 105e | +17° | 3 + 6 × 0.35 | 48 |

TABLE 4.2

| | | Tyre B1 (acc. to invention) | | Tyre C1 (acc. to invention) | |
|---|---|---|---|---|---|
| Layer | Cord angle | Cord | Density [cord/dm] | Cord | Density [cord/dm] |
| 105a | +17° | 3 + 6 × 0.28 | 70 | 3 + 8 × 0.28 | 60 |
| 105b | −17° | 3 + 6 × 0.28 | 70 | 3 + 8 × 0.28 | 60 |
| 105c | 0° | 3 × (1 × 0.20 + 6 × 0.175) | 60 | 3 × (1 × 0.20 + 6 × 0.175) | 60 |
| 105d | +17° | 3 × 4 × 0.22 | 40 | 5 × 0.25 | 40 |
| 105e | +17° | 3 + 6 × 0.28 | 70 | 3 + 8 × 0.28 | 60 |

The weight of the belt structure and the thickness of the belt structure measured along the section H-H shown in FIGS. 6 and 7 are indicated in Table 5.

TABLE 4

| | Structure | Filament diameter [mm] | Cord diameter [mm] | Cord break load [N] | Cord rigidity [N] |
|---|---|---|---|---|---|
| 3 + 6 × 0.35 | Three non-preformed central filaments and six non-preformed crown filaments | 0.35 | 1.37 | 2400 | 1.54 |
| 3 + 6 × 0.28 | Three non-preformed central filaments and six non-preformed crown filaments | 0.28 | 1.06 | 1550 | 0.59 |
| 3 + 8 × 0.28 | Three non preformed central filaments and eight preformed crown filaments | 0.28 | 1.16 | 1730 | 0.78 |
| 3 × 7 × 0.20 | Three stranded strands. Each strand has seven non-preformed filaments with the same diameter | 0.20 | 1.38 | 1470 | 0.31 |
| 3 × 4 × 0.22 | Three stranded strands. Each strand has four non-preformed filaments with the same diameter | 0.22 | 1.18 | 1020 | 0.28 |
| 3 × (1 × 0.20 + 6 × 0.175) | Three stranded strands. Each strand has a non-preformed central filament and six preformed crown filaments with a different diameter | 0.20 (central) 0.175 (crown) | 1.25 | 1280 | 0.21 |
| 5 × 0.25 | Five preformed filaments | 0.25 | 0.75 | 680 | 0.22 |

TABLE 5

|  | Tyre A1 | Tyre B1 | Tyre C1 |
| --- | --- | --- | --- |
| Weight [kg] | 15.5 | 15.8 | 16.6 |
| Thickness [mm] | 7.7 | 8.2 | 8.1 |

Along the section H-H the thickness of the belt structures of the tyres B1 and C1 is greater than that of the tyre A1 because, in that section, there are five layers instead of four layers.

The weight of the belt structure of the tyres B1 and C1 is slightly greater than that of the tyre A1. This depends on the fact that the belt layer 105d extends axially over a greater width in the tyres B1 and C1 than in the tyre A1.

The Applicant carried out a series of indoor and outdoor experimental tests on prototypes of the tyres A1, B1 and C1. These tests will be commented on briefly below.

Integrity Test

The test procedures are as described above except that the test was interrupted for all the tyres A1 and C1 at 18,615 km. No tyre was damaged.

The Applicant carried out a shear graph analysis of the tyres A1 and C1 at the end of the tests carried out on the track as described above.

As regards the four tyres A1 (comparison tyres), they were found to have small defects present substantially in all the zones examined.

As regards, instead, the four tyres C1 (according to the invention), surprisingly they had only a few isolated defects and only in the case of two of the four tyres.

During the integrity test, the Applicant measured the average temperature of the tyres (between tyre and rim) and noted that the temperature reached by the tyres C1 was significantly lower than the temperature reached by the tyres A1, even by as much as 5-6° C.

Rigidity Test of the Belt Structure

The Applicant carried out an indoor test in order to assess the flexibility parameter fp of the belt structure of the tyres A1 and B1 using the same method described above. The results obtained are summarised in Table 6.

TABLE 6

|  | Tyre A1 (comparison) | Tyre B1 (acc. to invention) |
| --- | --- | --- |
| Centre radius difference (dc) | 1.76 mm | 0.95 mm |
| Mean value of shoulder radius difference (ds) | 2.88 mm | 2.18 mm |
| Difference (dc − ds) | −1.12 mm | −1.23 mm |
| Flexibility parameter fp (\|dc − ds\|/dc) | 63.6% | 129.5% |

As can be seen, the flexibility of the belt structure in the tyre B1 according to the invention is about twice the flexibility of the belt structure in the comparison tyre A1.

The reason behind these surprising and unexpected results with regard to the superior integrity and resistance characteristics of the tyres according to the invention has not yet been fully understood by the Applicant. As mentioned above, without being limited to any one theory in this connection, the Applicant considers that the greater flexibility of the belt structure, which is obtained by the use of more flexible smaller-diameter cords, formed by smaller-diameter filaments, results in an overall better working performance of the belt structure and carcass structure and in particular better absorption and/or better dissipation of the stresses imparted by the rolling travel of the tyre and/or by the impacts with the roughness of the ground.

The invention claimed is:

1. A pneumatic tyre for heavy load vehicle wheels, comprising:
    a carcass structure comprising at least one carcass ply;
    a belt structure arranged in a radially outer position with respect to said carcass structure; and
    a tread band arranged in a radially outer position with respect to said belt structure,
        wherein the belt structure comprises at least one reinforcing layer incorporating a plurality of reinforcing cords having diameters greater than 1.0 mm and less than or equal to 1.3 mm and being arranged substantially according to a circumferential direction, wherein each reinforcing cord comprises a plurality of stranded strands, and wherein each strand comprises a plurality of metal filaments having diameters greater than 0.12 mm and less than or equal to 0.14 mm,
        wherein the belt structure comprises a first main belt layer and a second main belt layer which is radially outer with respect to said first main belt layer,
        wherein the first main belt layer comprises a first plurality of metal cords inclined by a first angle with respect to the circumferential direction and the second main belt layer comprises a second plurality of metal cords inclined by a second angle with respect to the circumferential direction, wherein the cords of said first and said second plurality of metal cords have diameters smaller than the diameters of the reinforcing cords,
        wherein the metal cords of said first and said second plurality of metal cords have diameters not greater than 1.3 mm and comprise a plurality of filaments having diameters not greater than 0.30 mm,
        wherein said belt structure further comprises a third belt layer arranged as radially outermost layer of the belt structure, and wherein said third belt layer comprises a fourth plurality of metal cords comprising a plurality of filaments, the fourth plurality of metal cords being inclined at an angle between 10° and 70°, and
        wherein said at least one reinforcing layer includes two axially separated reinforcing strips, which are arranged axially spaced from an equatorial plane of the tyre and in a radially outer position with respect to said second main belt layer.

2. The tyre of claim 1, wherein the cords of said first and said second plurality of metal cords have diameters between 0.90 mm and 1.20 mm.

3. The tyre of claim 1, wherein the cords of said first and of said second plurality of metal cords comprise a plurality of filaments having diameters greater than, or equal to, 0.20 mm.

4. The tyre of claim 1, wherein the cords of said first and said second plurality of metal cords comprise a first number of central filaments and a second number of crown filaments which are arranged around said central filaments.

5. The tyre of claim 4, wherein at least one of said central filaments and said crown filaments are preformed.

6. The tyre of claim 1, wherein the metal cords of said fourth plurality of metal cords have diameters between 0.70 mm and 1.2 mm.

7. The tyre of claim 1, wherein the metal cords of said fourth plurality of metal cords comprise a plurality of filaments having diameters greater than or equal to 0.22 mm.

8. The tyre of claim 1, wherein the reinforcing cords are high elongation cords.

9. The tyre of claim 1, wherein the metal cords of said fourth plurality of metal cords are high elongation cords.

10. The tyre of claim 1, wherein said tyre has a width greater than or equal to 365 mm, wherein said belt structure comprises a third main belt layer radially outer with respect to said second main belt layer, and wherein said third main belt layer comprises a fifth plurality of metal cords inclined by a fourth angle with respect to the circumferential direction.

11. The tyre of claim 10, wherein the cords of said fifth plurality of metal cords have diameters between 0.90 mm and 1.20 mm.

12. The tyre of claim 10, wherein the cords of said fifth plurality of metal cords comprise a plurality of filaments having diameters greater than or equal to 0.20 mm.

13. The tyre of claim 1, wherein said at least one reinforcing layer has a width between about 10% and about 30% of the maximum width of the belt structure.

14. The tyre of claim 1, wherein most layers of said belt structure comprise metal cords having diameters not greater than 1.30 mm and comprise a plurality of filaments having diameters not greater than 0.30 mm.

15. The tyre of claim 1, wherein all layers of said belt structure comprise metal cords having diameters not greater than 1.30 mm and comprise a plurality of filaments having diameters not greater than 0.30 mm.

16. The tyre of claim 1, wherein a flexibility parameter of the belt structure is greater than or equal to 10%.

17. The tyre of claim 1, wherein the filaments are stranded together in a single stranding step.

* * * * *